US010185064B2

(12) United States Patent
Powell et al.

(10) Patent No.: US 10,185,064 B2
(45) Date of Patent: Jan. 22, 2019

(54) CURVED EDGE DISPLAY WITH CONTROLLED LUMINANCE

(71) Applicant: Microsoft Technology Licensing, LLC, Redmond, WA (US)

(72) Inventors: Karlton David Powell, Lake Stevens, WA (US); John Michael Lutian, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/421,303

(22) Filed: Jan. 31, 2017

(65) Prior Publication Data
US 2018/0113241 A1 Apr. 26, 2018

Related U.S. Application Data

(63) Continuation-in-part of application No. 15/335,336, filed on Oct. 26, 2016.

(51) Int. Cl.
G09G 3/30 (2006.01)
G02B 5/04 (2006.01)
(Continued)

(52) U.S. Cl.
CPC ............ G02B 5/045 (2013.01); G02B 5/32 (2013.01); G02B 27/0025 (2013.01);
(Continued)

(58) Field of Classification Search
CPC ......... H01L 51/5275; H01L 2251/5338; H01L 27/1214; G09G 3/3208; G09G 3/2003;
(Continued)

(56) References Cited

U.S. PATENT DOCUMENTS 5,894,359 A * 4/1999 Suzuki .................. G02B 5/203
348/E5.136
6,927,908 B2 8/2005 Stark
(Continued)

FOREIGN PATENT DOCUMENTS

CN 204480603 U 7/2015
KR 20150033969 A 4/2015
(Continued)

OTHER PUBLICATIONS

"Universal Display's Borderless Flexible OLED Panel 'Best in Show' at SID Display Week", Industrial + Specialty Printing website, http://industrial-printing.net/content/universal-displays-borderless-flexible-oled-panel-best-show-sid-display-week#.Vz07ReJ94dV, May 30, 2013, 2 pages.
(Continued)

Primary Examiner — Jennifer Nguyen
(74) Attorney, Agent, or Firm — Alleman Hall Creasman & Tuttle LLP

(57) ABSTRACT

An electronic display comprises a display matrix, an image-correcting layer, and a luminance-correcting layer. The display matrix includes a flat face portion, a curved corner portion, a light-releasing surface, and a series of pixels extending across the flat face portion and around the curved corner portion. Coupled to the light-releasing surface of the display matrix, the image-correcting layer is configured to transmit light released from the flat face portion of the display matrix and to reorient light released from the curved corner portion of the display matrix such that the transmitted light and the reoriented light exit the image-correcting layer substantially in parallel, forming an apparent plane image of the series of pixels. Arranged between the light-releasing display surface and the image-correcting layer, the luminance-correcting layer is configured to deflect the light
(Continued)

released from the curved corner portion into an acceptance profile of the image-correcting layer.

19 Claims, 15 Drawing Sheets

(51) Int. Cl.
*G02B 5/32* (2006.01)
*G02B 27/00* (2006.01)
*G09G 3/3208* (2016.01)

(52) U.S. Cl.
CPC ..... *G09G 3/3208* (2013.01); *G09G 2300/026* (2013.01); *G09G 2380/02* (2013.01)

(58) Field of Classification Search
CPC ... G09G 2320/0271; G09G 2320/0233; G09G 2300/026; G02B 5/32; G02B 5/045; G02B 27/0025; G09F 3/3208
USPC ........................................ 345/76, 87; 349/64
See application file for complete search history.

(56) References Cited

U.S. PATENT DOCUMENTS

| | | | |
|---|---|---|---|
| 7,310,050 | B2 | 12/2007 | Yeh |
| 7,367,705 | B2 | 5/2008 | McCollum et al. |
| 8,092,068 | B2 | 1/2012 | Parker et al. |
| 8,339,526 | B2 | 12/2012 | Minikey et al. |
| 8,472,114 | B2 | 6/2013 | Watanabe |
| 8,542,289 | B1 | 9/2013 | McClatchie |
| 8,853,941 | B2 | 10/2014 | Jung |
| 9,123,266 | B2 | 9/2015 | Bastani et al. |
| 9,146,400 | B1 | 9/2015 | Lee et al. |
| 9,271,395 | B2 | 2/2016 | Hongo et al. |
| 9,274,369 | B1 | 3/2016 | Lee et al. |
| 9,568,800 | B1 | 2/2017 | Sprague |
| 2003/0055314 | A1 | 3/2003 | Petillo et al. |
| 2004/0108806 | A1 | 6/2004 | Cok et al. |
| 2006/0077544 | A1 | 4/2006 | Stark |
| 2006/0251365 | A1 | 11/2006 | Brewer |
| 2007/0103910 | A1 | 5/2007 | Brickey et al. |
| 2007/0236939 | A1 | 10/2007 | Ouderkirk et al. |
| 2008/0232751 | A1 | 9/2008 | Tabor |
| 2009/0085831 | A1 | 4/2009 | Odoi et al. |
| 2010/0141869 | A1 | 6/2010 | Biemath et al. |
| 2011/0187966 | A1* | 8/2011 | Yokota ............... G02B 3/005 349/62 |
| 2011/0242686 | A1* | 10/2011 | Watanabe ......... G02B 17/0884 359/804 |
| 2011/0255301 | A1 | 10/2011 | Watanabe |
| 2012/0008340 | A1 | 1/2012 | Tomotoshi et al. |
| 2012/0113614 | A1 | 5/2012 | Watanabe |
| 2013/0271957 | A1 | 10/2013 | Etienne et al. |
| 2013/0301263 | A1 | 11/2013 | Yamanka |
| 2014/0037257 | A1 | 2/2014 | Yang et al. |
| 2014/0071539 | A1 | 3/2014 | Gao |
| 2014/0092283 | A1 | 4/2014 | Yang et al. |
| 2014/0092346 | A1 | 4/2014 | Yang et al. |
| 2014/0111974 | A1 | 4/2014 | Choi et al. |
| 2014/0126183 | A1 | 5/2014 | Geng et al. |
| 2014/0218956 | A1 | 8/2014 | Wu |
| 2014/0320543 | A1 | 10/2014 | Oh et al. |
| 2014/0346474 | A1 | 11/2014 | Jeong et al. |
| 2014/0355227 | A1 | 12/2014 | Lim |
| 2015/0001483 | A1 | 1/2015 | Namkung et al. |
| 2015/0092442 | A1 | 4/2015 | Wu |
| 2015/0093086 | A1 | 4/2015 | Wu |
| 2015/0177561 | A1 | 6/2015 | Yoshida |
| 2015/0219831 | A1 | 8/2015 | Tanaka |
| 2015/0346542 | A1 | 12/2015 | An et al. |
| 2015/0370080 | A1 | 12/2015 | Meacham |
| 2015/0378094 | A1 | 12/2015 | Lu et al. |
| 2016/0071457 | A1 | 3/2016 | Kim et al. |
| 2016/0133169 | A1 | 5/2016 | Park et al. |
| 2016/0196778 | A1 | 7/2016 | Cha |
| 2016/0202726 | A1 | 7/2016 | Seen et al. |
| 2016/0238785 | A1* | 8/2016 | Park ..................... G02B 6/0068 |
| 2017/0092703 | A1* | 3/2017 | Bae ..................... H01L 27/3232 |

FOREIGN PATENT DOCUMENTS

| | | |
|---|---|---|
| WO | 2008014761 A1 | 2/2008 |
| WO | 2016064595 A1 | 4/2016 |

OTHER PUBLICATIONS

Vincent, J., "Chinese manufacturers are trying to kill the smartphone bezel", The Verge website, http://www.theverge.com/2015/3/25/8287663/smartphone-bezel-less-design-china, Mar. 25, 2015, 3 pages.

Lopez, N., "Dell brings its edgeless display to the powerhouse XPS 15", The Next Web website, http://thenextweb.com/gadgets/2015/10/08/dell-brings-its-edgeless-display-to-the-powerhouse-xps-15/#gref, Oct. 8, 2015, 4 pages.

Telegraph Reporters, "iPhone rumours: Apple to reinvent phone with edgeless display and no home button next year", The Telegraph website, http://www.telegraph.co.uk/technology/2016/05/12/iphone-rumours-apple-to-reinvent-phone-with-edgeless-display-and/, May 12, 2016, 11 pages.

Lee, H., "Quad Edge Display: Accelerating the Evolution of Curved", Voices at Samsung Semiconductor blog, Available at: http://www.samsungsemiblog.com/displays/quad-edge-display-accelerating-the-evolution-of-curved-smartphones/, Published Mar. 23, 2016, 2 pages.

Kundan, D. et al., "Projection and Interaction with Ad-hoc Interfaces on Non-planar Surfaces", In Proceedings of 2013 Second International Conference on Advanced Computing, Networking and Security, Dec. 15, 2013, Bangalore, India, 6 pages.

Arianpour, et al., "Enhanced signal coupling in wide-field fiber-coupled imagers", In Journal of Optics Express, vol. 23, Issue 4, Feb. 23, 2015, pp. 5285-5299.

Yan, et al., "Edge-Lighting Light Guide Plate Based on Micro-Prism for Liquid Crystal Display", In Journal of Display Technology, vol. 5, Issue 9, Sep. 2009, pp. 355-357.

"Non-Final Office Action Issued in U.S. Appl. No. 15/346,643", dated Aug. 24, 2017, 8 pages.

ISA European Patent Office, International Search Report and Written Opinion Issued in Application No. PCT/US2017/059137, dated Feb. 16, 2018, WIPO, 10 pages.

"Non-Final Office Action Issued in U.S. Appl. No. 15/335,336", dated Feb. 22, 2018, 12 pages.

"Notice of Allowance Issued in U.S. Appl. No. 15/346,643", dated Mar. 26, 2018, 5 pages.

"Final Office Action Issued in U.S. Appl. No. 15/335,336", dated Jun. 29, 2018, 14 Pages.

"Notice of Allowance Issued in U.S. Appl. No. 15/335,336", dated Oct. 24, 2018, 9 Pages.

* cited by examiner

CURVED EDGE DISPLAY WITH CONTROLLED LUMINANCE

CROSS-REFERENCE TO RELATED APPLICATION

This application is a continuation-in-part of U.S. patent application Ser. No. 15/335,336, filed 26 Oct. 2016, the entirety of which is hereby incorporated by reference herein.

BACKGROUND

Electronic display technology has undergone rapid growth in recent years. Displays have become larger, flatter, brighter, more efficient, and capable of true-to-life color at high resolution. On the other hand, display technology does not currently leverage the advantages of modular design, which is enjoyed in other technological areas.

SUMMARY

One implementation provides an electronic display comprising a display matrix, an image-correcting layer, and a luminance-correcting layer. The display matrix includes a flat face portion, a curved corner portion, a light-releasing surface, and a series of pixels extending across the flat face portion and around the curved corner portion. Coupled to the light-releasing surface of the display matrix, the image-correcting layer is configured to transmit light released from the flat face portion of the display matrix and to reorient light released from the curved corner portion of the display matrix such that the transmitted light and the reoriented light exit the image-correcting layer substantially in parallel, forming an apparent plane image of the series of pixels. Arranged between the light-releasing display surface and the image-correcting layer, the luminance-correcting layer is configured to deflect the light released from the curved corner portion into an acceptance profile of the image-correcting layer.

This Summary is provided to introduce in a simplified form a selection of concepts that are further described in the Detailed Description below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
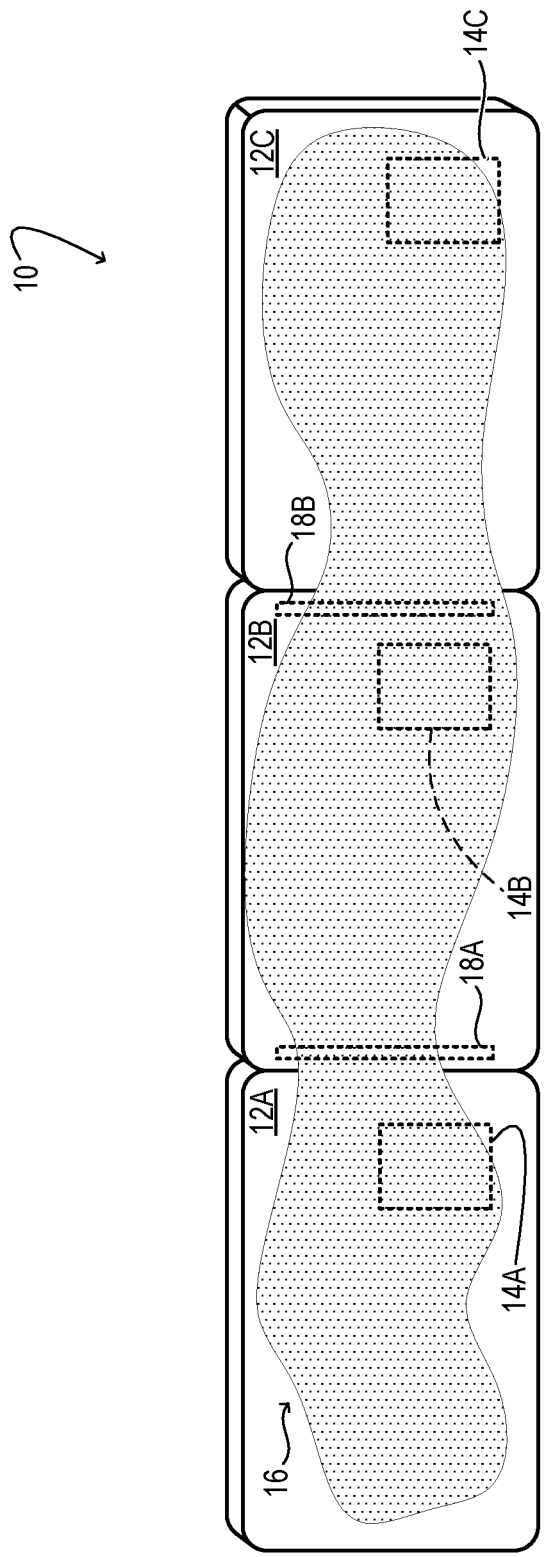
FIG. 1 shows aspects of an example modular electronic display system.

Aspects of this disclosure will now be described by example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an electronic display system 10 in one example implementation. Display system 10 includes a plurality of abutting, borderless display modules 12 (display modules 12A, 12B, 12C, specifically) having at least one computer 14 (computer 14A, 14B, and/or 14C, for example). The computer communicates with each of the borderless display modules and is configured to supply image data thereto. The computer may include one or more processors, such as a graphics processor, and associated electronic memory. More specifically, the computer may be configured to render image data for a display image 16 to be cooperatively presented on the display system, such that the display image extends across the plurality of display modules. The image data may be comprised of a plurality of image-data components, each encoding the portion of the display image to be presented on a corresponding display module. The computer may be further configured to convey each of the image-data components to its respective display module, so that a continuous, essentially unbroken display image may be presented on the display system. The mode of conveyance of the image-data components may be wired or wireless. In the implementation of FIG. 1, each of the display modules is observed in a landscape orientation and situated for horizontal abutment. Arranged in this manner, the display system presents a wide, panoramic display image. In other implementations, each of the display modules may be observed in a portrait orientation, to accommodate display images of other aspect ratios.

In some implementations, at least one of the display modules 12 may include an abutment sensor 18 (abutment sensor 18A and/or 18B in FIG. 1, for example) configured to identify abutting display modules. Output from the abutment sensor or sensors may be conveyed to computer 14B, so that the computer knows the geometric relationship of one display module relative to another, and is therefore able to map each image-data component to the corresponding display module. In some implementations, some functionality of a computer (e.g., computer 14B) may be distributed to other computers of display system 10.

In a modular display system, such as display system 10, each display module 12 may be borderless—viz., capable of presenting display content all the way to the edge. However, a borderless display may be subject to manufacturing constraints associated with the display matrix used to present the image content. Some of these constraints are discussed below, with reference to FIGS. 2A, 2B, and 2C.

Figure 2A:
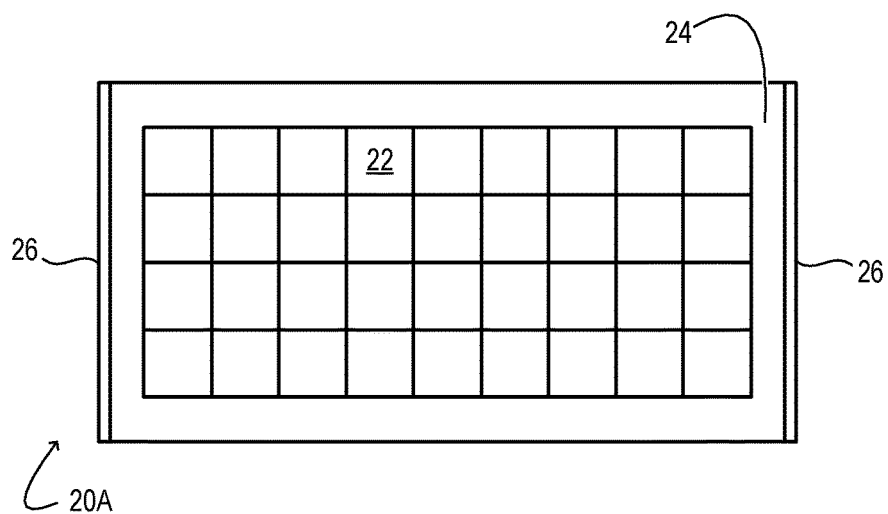
FIGS. 2A, 2B, and 2C show aspects of an example display matrix of an electronic display module.

FIG. 2A shows aspects of a display matrix 20A in schematic detail. The display matrix includes a plurality of pixels 22 bordered by an inactive edge 24. The inactive edge of the display matrix adjoins a sealing or supporting structure 26. The sealing or supporting structure may be configured to protect the internal componentry of the display matrix, to provide electrical connection for addressing the pixels, or to secure the display matrix to a chassis, for example. Naturally, if display matrix 20A were to lie flat in operation, there would be an inactive border area surrounding the active area of the display; lying flat, display matrix 20 could not be used in a borderless display module.

Figure 2B:
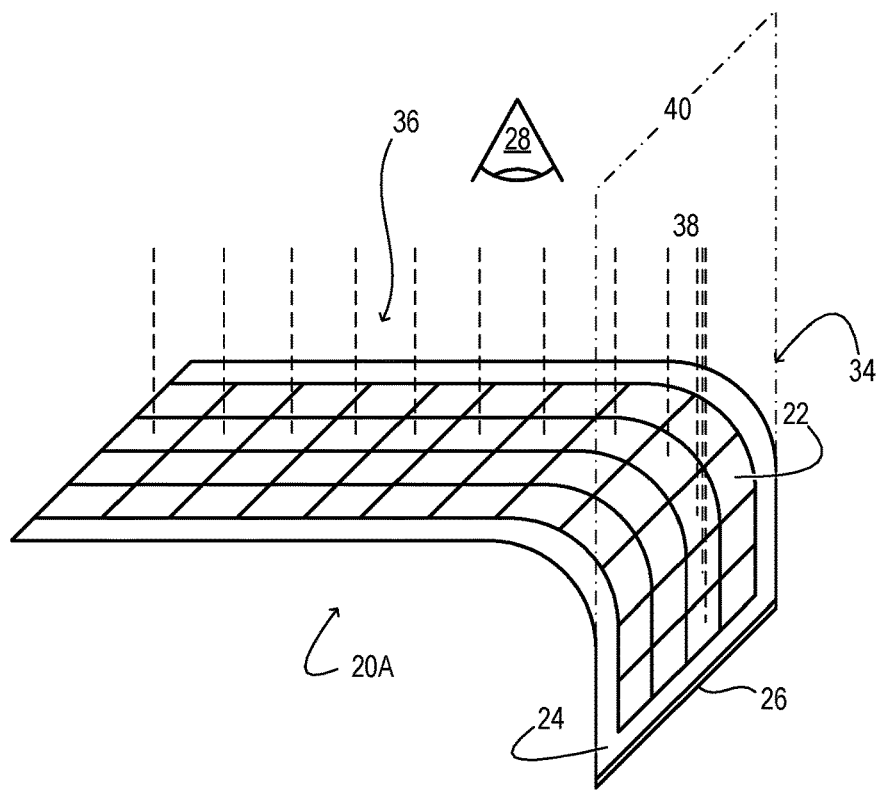
Figure 2C:
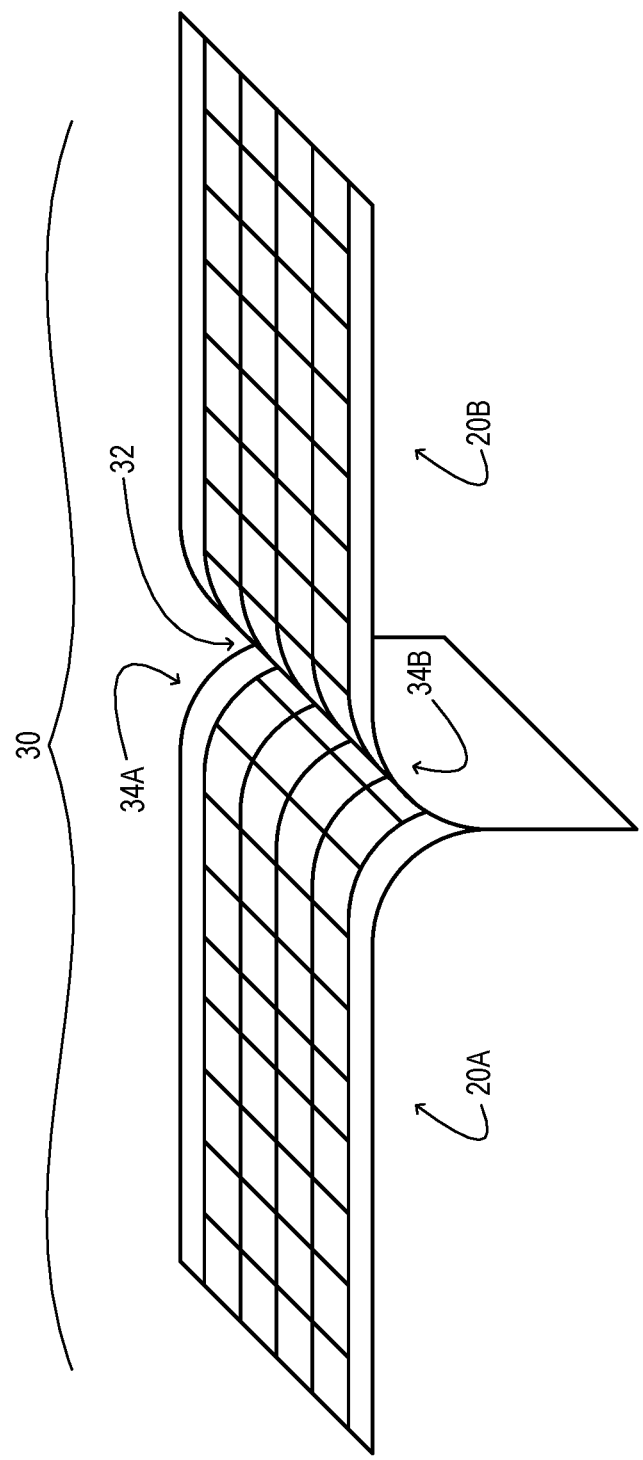

In FIG. 2B, however, the region adjacent to inactive edge 24 is curved away from observer 28. In this configuration, display matrix 20A could be used in a borderless display module, because the inactive edge and adjoining sealing or supporting structure 26 are hidden from the observer's sight. As shown in FIG. 2C, a second, abutting display matrix 20B may now be added, to provide a continuous, essentially unbroken display area 30 for display of a continuous, essentially unbroken display image.

Even though display area 30 of FIG. 2C is continuous and essentially unbroken, it may exhibit severe image distortion along and adjacent the shared edge 32 between curved edge regions 34A and 34B of abutting display modules 20A and 20B. Likewise, either of the display modules, when observed separately, would exhibit distortion at the curved edge regions. This issue is easily apparent from the view of FIG. 2B. Distortion occurs because observer 28 cannot sight a plane image of the series of pixels extending across flat face portion 36 and around curved corner portion 34 of the display matrix. Rather, the pixels of the curved corner portion are bent below the plane of the flat face portion (the image plane of the observer). The geometric projection of these pixels parallel to the observer's line of sight will exhibit compression 38, therefore, at the curved edge region.

Further, a gap may be required between adjacent display modules, in order to add a protective cover glass (glass or polymer) for protecting the display modules. Even if a constant-thickness, curved cover glass is used, this still may result in significant distortion, along with uniformity roll-off and coloration. These issues may be expected because the refracted angles in the cover-glass media that correspond to view angles at the viewer position may be high relative to the display-surface normal.

Set forth in this disclosure are approaches to correct the observed image of pixels 22 located in the curved corner portion 34 of a display matrix 20, so that the pixel pitch appears uniform all the way to apparent edge 40 (the limit viewable by the observer). Based on borderless display modules 12 engineered as described herein, an effectively seamless modular electronic display system 10 can be constructed.

Figure 3:
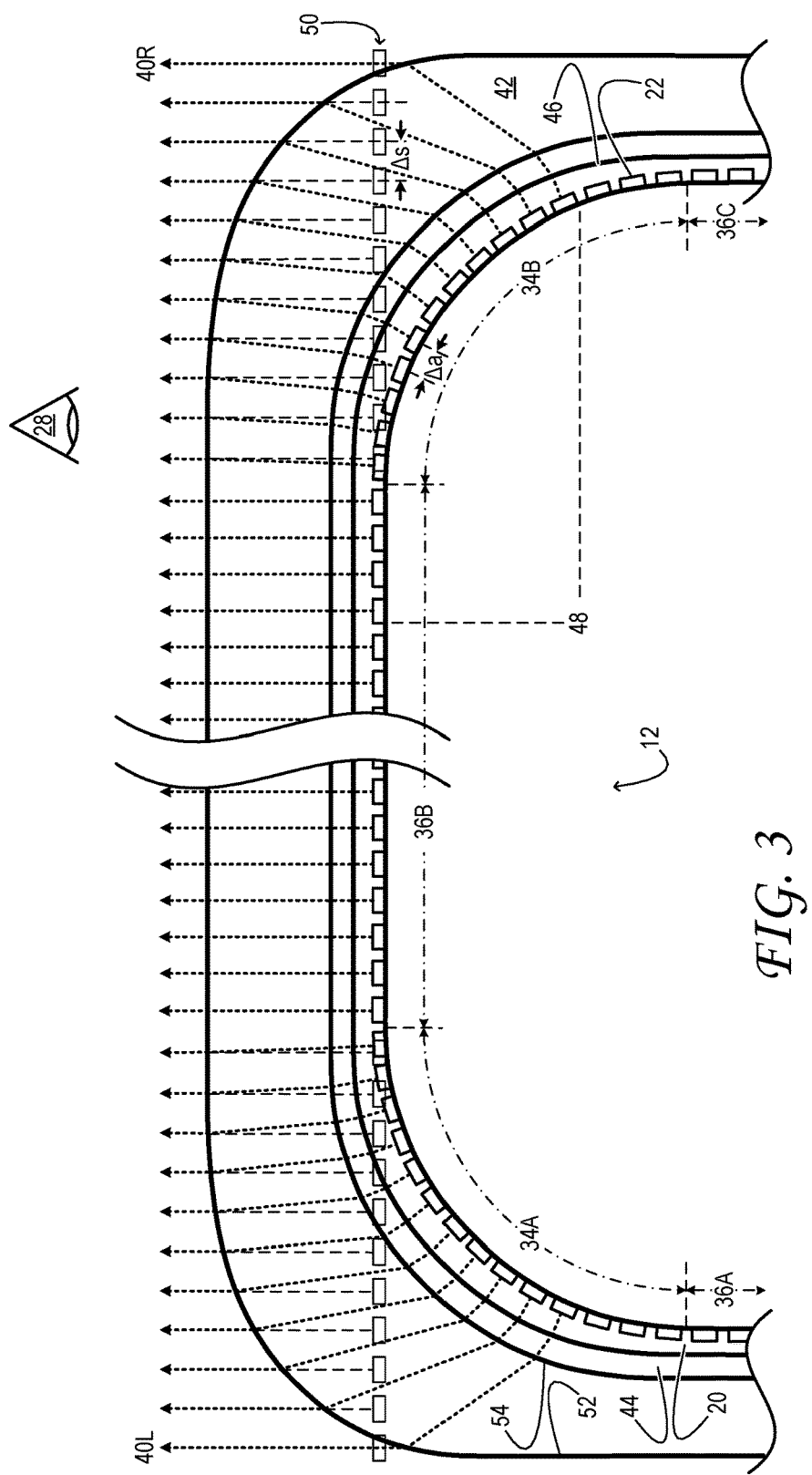
FIG. 3 shows aspects of an example electronic display module.

FIG. 3 schematically shows aspects of an example electronic display module 12 in cross section. The electronic display module includes display matrix 20, image-correcting layer 42, and a luminance-correcting layer 44.

Display matrix 20 includes curved corner portions 34A and 34B. The display matrix also includes a flat face portion 36B between curved corner portions 34A and 34B, and flat face portions 36A and 36C, which are substantially perpendicular to flat face portion 36B on the other sides of curved corner portions 34A and 34B, respectively. The display matrix presents a light-releasing surface 46 with pixels 22 arranged below the light-releasing surface. An example pixel series 48 (identified for purposes of illustration) extends across flat face portion 36B and around curved corner portion 34B. It will be noted that this series of pixels may be viewable through curved corner portion 34B, flat face portion 36B, and/or flat face portion 36C, depending on the disposition of observer 28 relative to display module 12. Accordingly, display matrix 20 can be used in a display module viewable from the side as well as the top. While only a small number of pixels are illustrated in FIG. 3, it is to be understood that this description is compatible with any display resolution.

Display matrix 20 may incorporate any suitable display technology, but must be capable of curvature. In some but not all implementations, to facilitate curvature, the display matrix may be flexible and/or bendable. As such, the display matrix may comprise an organic light-emitting diode (OLED) matrix. In the OLED art, a 'bendable' matrix typically supports a radius of curvature down to 3 millimeters (mm), while a 'flexible' matrix typically supports a radius of curvature down to 1 mm. Both bendable and flexible display matrices are compatible with this disclosure. In some implementations, each curved corner portion 34 of display matrix 20 admits of a cylindrical curvature, with a radius of the cylindrical curvature being 1 to 5 millimeters, or 3 to 5 millimeters in some examples, while other radii of curvature are also envisaged. In other implementations, the curvature may be non-cylindrical. The display matrix may have a thickness of about 300 microns in one, non-limiting implementation. The optical emitting layer for an OLED display matrix may typically be on the order of one-half the total thickness (e.g., 150 microns beneath surface of the display matrix). The thickness profile and refractive index of image correcting layer 42 (vide infra) accounts for the portion of the optical path between pixels 22 and light-releasing surface 46. Continuing in FIG. 3, image-correcting layer 42 is coupled to light-releasing surface 46 of display matrix 20. The image-correcting layer is configured to transmit light released from flat face portion 36B of the display matrix (at or near the surface normal) and to reorient light released from curved corner portion 34B such that the transmitted light and the reoriented light exit the image-correcting layer substantially in parallel, forming an apparent plane image 50 of pixel series 48. The term 'apparent plane image' is used because the pixels of the curved corner portion do not form a real image per se (as the pixels of the flat face portion do). The skilled reader will note that the optical path to the observer from pixels of the curved corner region is longer than the optical path from pixels in the flat face portion. However, the pixels of the curved corner portion do appear to emanate from correct angle within viewer's field of view (FOV), such that the entire series of pixels appears as a continuous image along the plane of observation. Likewise, the term 'substantially in parallel' reminds the reader that minor deviations from rigorously parallel emergence will compromise the efficacy of this approach to only a minor degree. In some implementations, the emerging rays may deviate by one degree or less. In other implementations, the emerging rays may deviate by one-half a degree or less. The term 'substantially in parallel' encompasses deviations within these ranges.

In this implementation, the apparent plane image is parallel to the flat face portion of the display matrix. Further, the linear spacing $\Delta S$ between the pixels in the image is functionally related to the along-the-arc spacing $\Delta A$ of the pixels in series 48, with $\Delta S = c \times \Delta A$. The parameter c may be any desired function of distance along the light-releasing surface. In one, non-limiting example, the spacing between the pixels in the image is equal to the spacing between the pixels of the series. In other words, the parameter c may be equal to one across the entire pixel series 48. This configuration provides, at normal (i.e., perpendicular to the plane) observation, zero distortion in the display image all the way to apparent edge 40R. In other implementations, the spacing between the pixels in the image may be approximately equal to the spacing between the pixels of the series—to within 10% or 5%, for example.

In the implementation of FIG. 3, image-correcting layer 42 is a refractive optic—i.e., a lens. In some implementations, the image-correcting layer is comprised of hardened glass. In other implementations, the image-correcting layer may be comprised of a transparent polymer, such as acrylic or polycarbonate, and may include a hard coating. Here, the thickness of the image-correcting layer is constant in a region arranged over flat face portion 36B of display matrix 20 and continuously varied in a region arranged over curved corner portion 34B of the display matrix. More specifically, the thickness of the image-correcting layer, as a function of distance along light-releasing surface 46, is controlled such that the transmitted light and the reoriented light exit the image-correcting layer in parallel, forming the apparent plane image 50 of the pixel series 48.

Figure 4A:
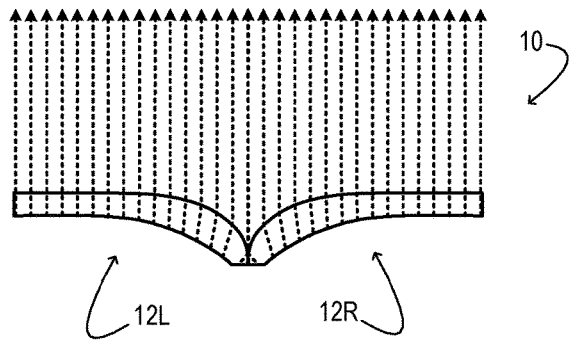
FIGS. 4A, 4B, and 4C show aspects of an example modular display system as viewed from three different observation angles.
Figure 4B:
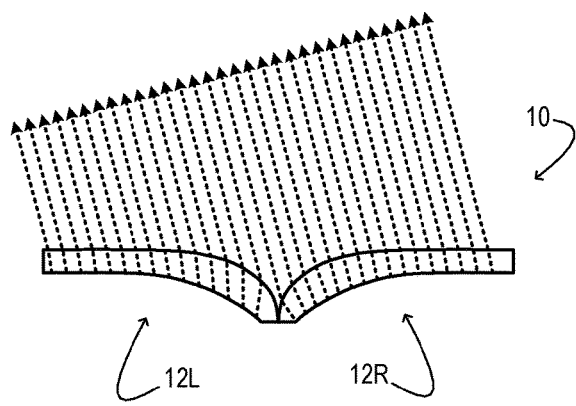
Figure 4C:
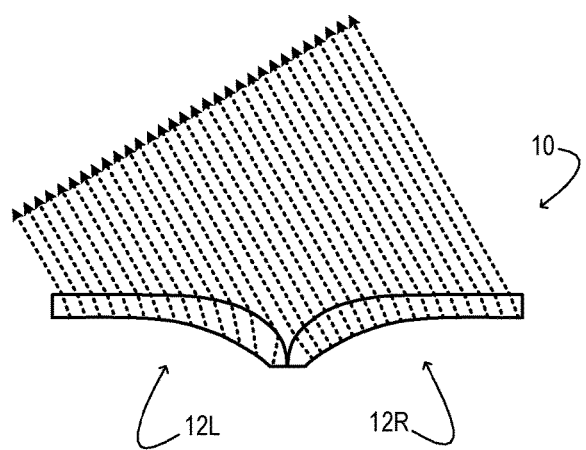

A display module 12 having an image-correcting layer 42 may be incorporated into a modular display system 10, as described above. FIGS. 4A, 4B, and 4C illustrate a modular system comprising a right display module 12R and a left display module 12L as viewed from three different observation angles. In FIG. 4A, the display system is observed from the normal angle. In FIGS. 4B and 4C, the display system is observed from 15 and 30°, respectively, from the normal angle. In these examples, an apparent plane image of pixels spans both the right and the left display modules.

Figure 5A:
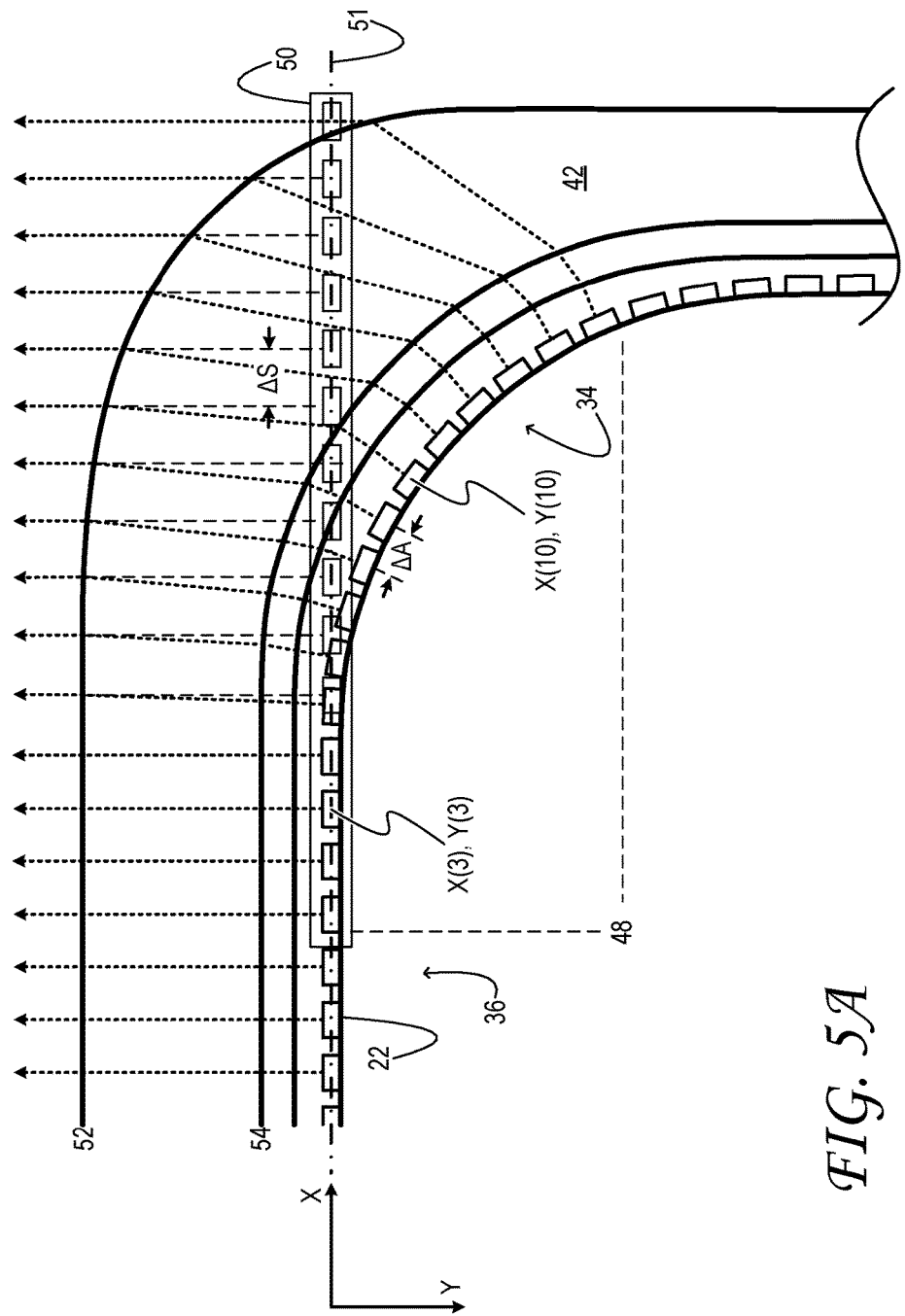
FIGS. 5A, 5B, and 5C show aspects of an example image-correcting layer of an electronic display module.

Ray tracing may be used to determine an appropriate thickness profile of image-correcting layer 42, to satisfy the conditions above. The partial cross-sectional views of FIGS. 5A, 5B, and 5B further illustrate the ray-tracing. In some cases, the curvature desired for display matrix 20 is an initial constraint. Turning first to FIG. 5A, the curvature may be expressed as a pair of parametric functions X(i), Y(i), where the parameter i is the number of the pixel in a given series of pixels, X is the horizontal position of the pixel, and Y is the displacement of the pixel below the horizontal plane 51 of the pixels of flat face portion 36. Once the curvature of the display matrix is established, the image-correcting layer profile is determined by tracing a ray from each pixel in a direction normal to that pixel, and may depend on the refractive index and thickness of various layers in between pixels and the exit surface of the image correcting layer, such as the top display layer above the emitting pixel layer, any optical bond layers, and the optional luminance correcting layer 44 (vide infra). In a closed-loop manner, the image-correcting layer is set to the appropriate thickness so that the traced ray exits the image-correcting layer normal to the flat face portion 36 of the display matrix. This optical condition will make the image of every pixel in the series appear to lie on horizontal plane 51, from the point of view of the observer. In implementations in which the image-correcting layer is a bulk refractor, the ray-tracing procedure invokes Snell's Law at exit surface 52 of the image-correcting layer. In implementations in which the refractive index changes at entry surface 54, the ray-tracing procedure may also invoke Snell's Law at the entry surface.

Figure 5B:
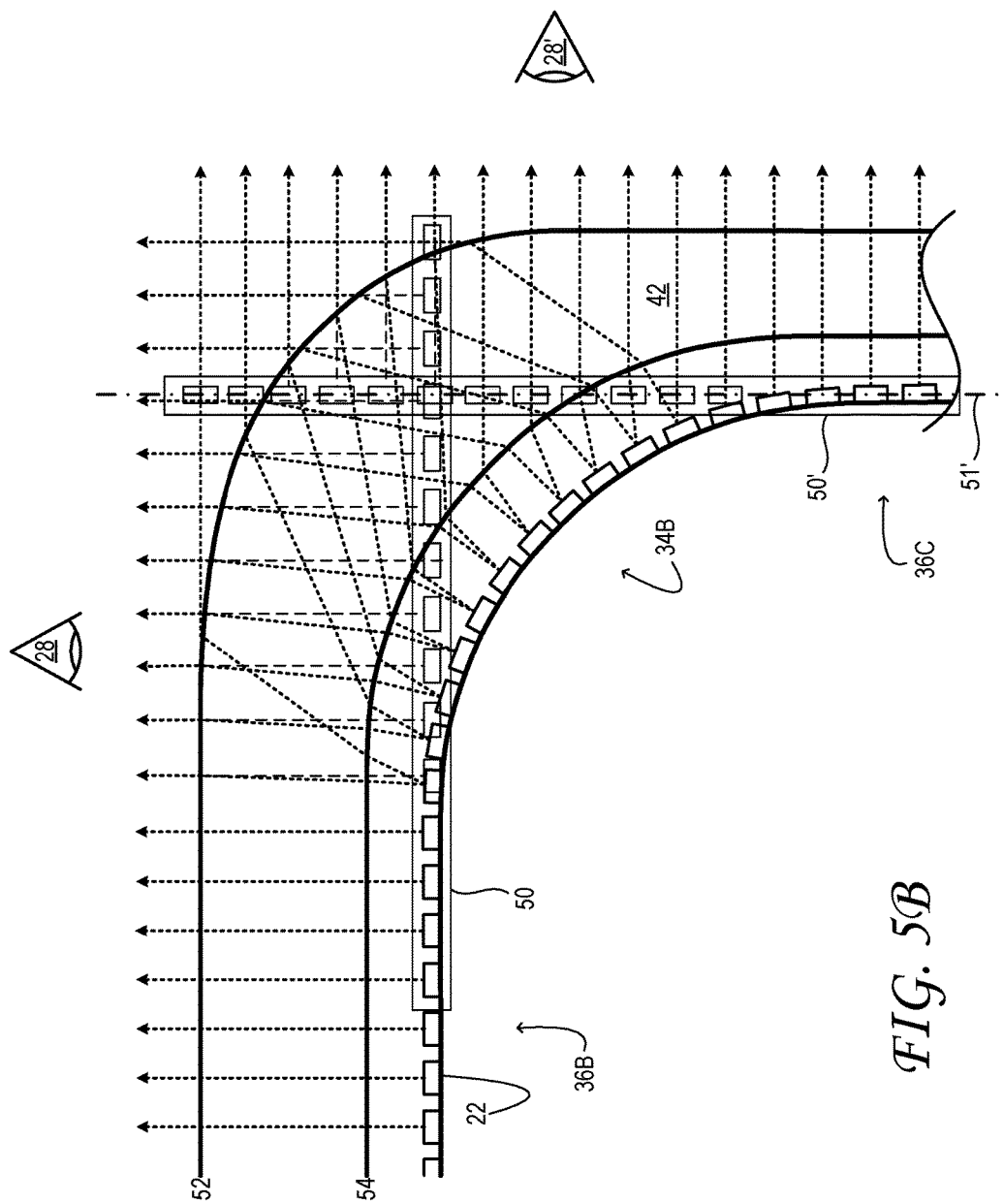
Figure 5C:
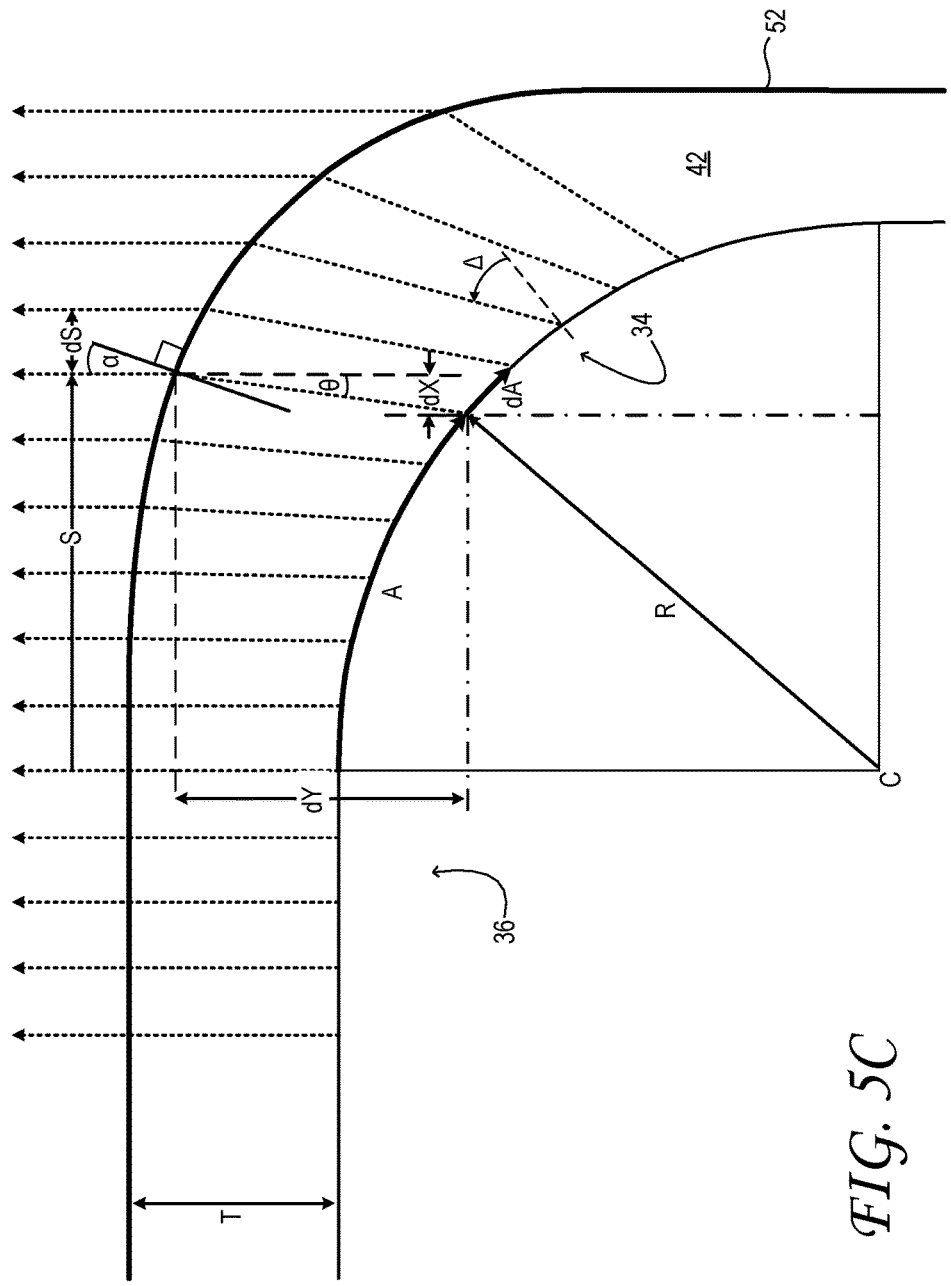

As shown in the ray-tracing diagram of FIG. 5B, image-correcting layer 42 may be configured to reduce distortion on viewing display matrix 20 from the front (i.e., normal to flat face portion 36B) and simultaneously to reduce distortion on viewing the display matrix from the side (i.e., normal to flat face portion 36C). In the example illustrated in FIG. 5B, the image-correcting layer forms an apparent plane image 50' visible to the side observer 28' as well as the apparent image plane 50 visible to the front observer 28. Apparent plane image 50' is aligned to observation plane 51', which is the plane of the pixels in flat face portion 36C.

An efficient application of ray tracing to compute the thickness profile of image-correcting layer 42 is summarized below, with reference now to FIG. 5B.

In the diagram of FIG. 5B, the parameter S represents horizontal distance across image-correcting layer 42 right of the center of curvature C of curved corner portion 34. The parameter A represents distance clockwise along the curved arc of the pixels of the display matrix. Iteration is begun with input of an appropriate initial thickness T of image-correcting layer 42 above flat face portion 36 of display matrix 20, and input of the radius of curvature R. At each step of the iteration, A is incremented by an appropriate dA, and S is incremented by dS=c×dA. This condition provides the desired geometric mapping between actual and imaged pixel positions. Every point on the curved arc of the pixels is joined to a corresponding point on exit surface 52 by a ray that propagates through the image-correcting layer. This ray propagates at an angle θ relative to the desired exit direction, which is normal to the flat face portion. The value of θ is determined trigonometrically, based on the increments dA and dS. As shown in FIG. 5B, α is the angle of the normal of exit surface 52 relative to the desired exit direction. Snell's Law relates α and θ. For efficiency of computation, a look-up table pairing α and θ based on Snell's Law is populated at the outset of the iteration. Using the look-up table, α is determined based on θ at each step of the iteration, and the value of the thickness T is updated based on α: T=T−dS tan(α). The process then loops back to compute a new value of the angle θ based on updated values of S and T.

Distortion in the display image is eliminated only when the c parameter equals one for the entire series of pixels of a curved corner portion. This requires a constrained thickness profile that may or may not be consistent with the desired aesthetic of display module 12 or with manufacturing constraints. In some scenarios, therefore, it may be desirable to strike a compromise between image correction and aesthetic and/or manufacturing constraints by tolerating a small and controlled amount of distortion over the curved corner portion. This is accomplished by setting the parameter c to a non-unit value or by varying c as a function of distance across the display matrix (S in FIG. 5B), which may be a linear or nonlinear function of distance, e.g., apparent pixel spacing or pixel position may vary with distance across as a gamma function. It should be noted that small changes having a low or imperceptible impact on distortion may be used to expand the edge for a given value of R, so as to enable control over target side thickness of the image-correcting layer, for mechanical or aesthetic purposes.

An image-correcting layer 42 having a thickness profile as described above may be hot-formed, ground, and polished, in some implementations. In other implementations, the image-correcting layer may be formed using a constant-thickness, hot-formed cover glass and undermolding the radius in a first molding step, followed by optically clear adhesive (OCA) bonding display matrix 20 to the undermolded cover glass. Alternatively, a curved, constant-thickness cover glass may be placed over the display matrix, and the curved corner gap may be filled with an optically clear resin.

In the approach outlined above, the refractive index of image-correcting layer 42 is assumed to be constant. This condition is not necessary, however, as controlled variation of the refractive index of the image-correcting layer may be used to change the thickness profile, for reasons described above in the context of using a non-unit c parameter. Accordingly, the refractive index of the image-correcting layer may be constant in a region arranged over a flat face portion 36 of the display matrix and continuously varied in a region arranged over a curved corner portion 34 of display matrix 20. More specifically, each of a thickness and a refractive index of the image-correcting layer, as functions of distance along light-releasing surface 46, may be controlled such that the transmitted light and the reoriented light exit the image-correcting layer in parallel, forming an apparent plane image 50 of the pixel series 48.

Returning now to FIG. 3, in display module 12, luminance-correcting layer 44 is arranged between display matrix 20 and image-correcting layer 42. The luminance-correcting layer optically couples light from the display matrix into the image-correcting layer. More specifically, the luminance-correcting layer is configured to deflect the light released from curved corner portions 34 into an acceptance cone (or other acceptance profile) of the image-correcting layer. To this end, the angle of deflection of the light released from the curved corner portions is varied across the luminance-correcting layer to optimize acceptance of the light into the image-correcting layer. The acceptance of the image-correcting layer may be defined as the function of the deviation or deflection angle of light from display normal along curved corner portions that is required to enable the outer surface of the image-correcting layer to refract the peak luminance toward viewer. This action may occur by an edge-lensing effect, so as to maximize uniformity to the edge and thereby minimize luminance roll-off to the edge, as well as support off-axis view angles of content emanating from an edge region, such that the view angle properties also have a similar apparent angular exit profile as the main plane regions of the display.

Luminance-correcting layer 44 is desirable in some implementations because light emission from the various pixels 22 of an OLED matrix may be less than Lambertian—having angular exit intensity profile with a full-width at half-maximum (FWHM) on order of 82°, for example. This means that the peak of the emission is directed at low angles relative to the surface normal of the display matrix. In the curved corner portions, therefore, a substantial portion of angularly emitted light energy would, without luminance correction, be unavailable for refraction at the desired exit angle. As described in further detail below, luminance-correcting layer 44 may be configured to provide uniform luminance for top viewing of display module 12 or for simultaneous top and side viewing. The luminance-correcting layer may be further configured for low reflectance of ambient light, to preserve display-image contrast.

Figure 6:
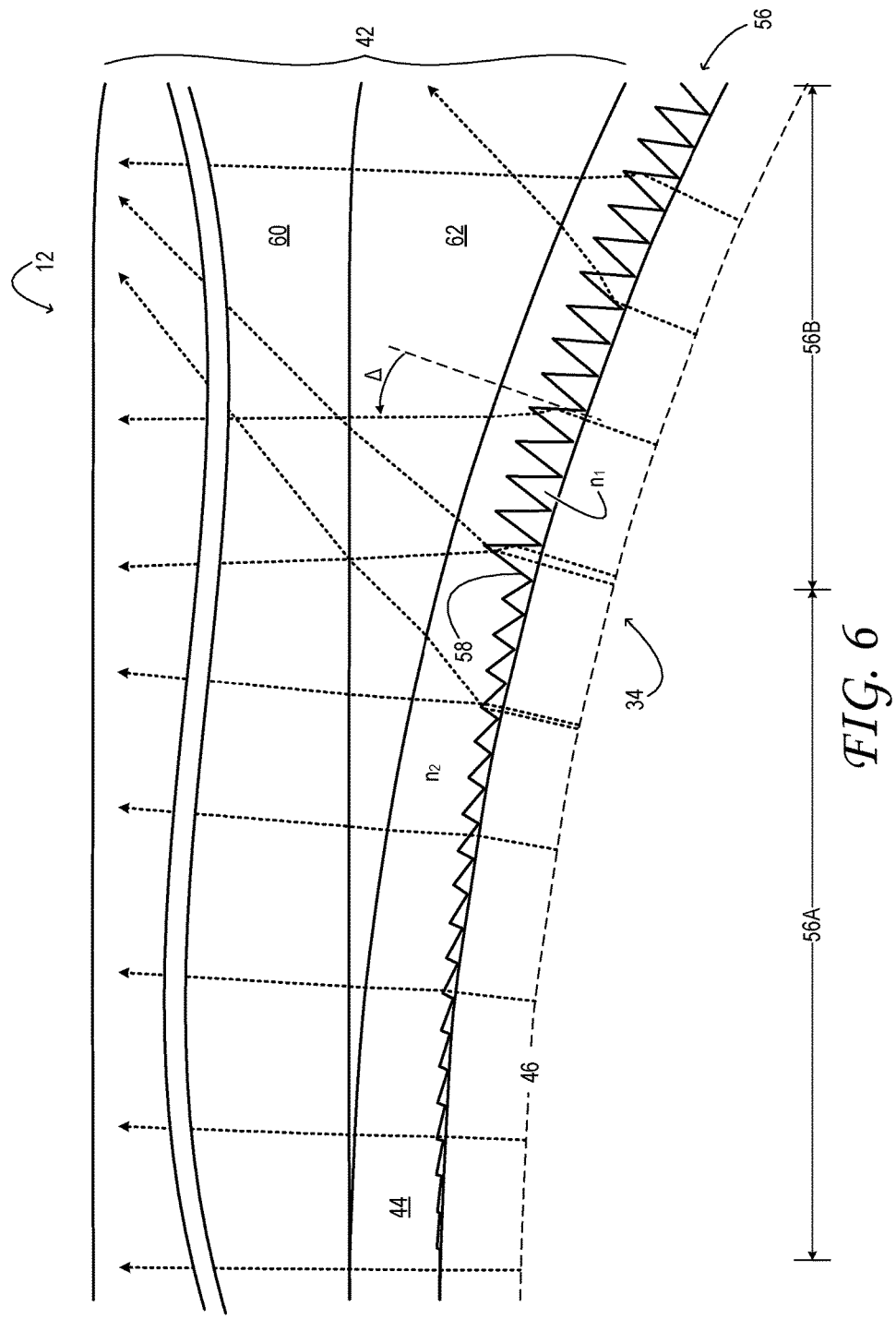
FIGS. 6, 7A, and 7B shows aspects of an example luminance-correcting layers of an electronic display module.

FIG. 6 shows aspects of luminance-correcting layer 44 in one example embodiment. The luminance-correcting layer includes a series of prismatic structures 56 configured to deflect the light released from curved corner portion 34 into the acceptance profile of image-correcting layer 42. Deflection may occur by refraction or by total internal reflection (TIR) followed by refraction, as described further below. In FIG. 6 and related examples, the luminance-correcting layer is a prismatic layer having a periodic array of prismatic facets arranged in a medium of higher or lower refractive index, so as to redirect the peak luminance (among other emission components) into the acceptance profile of the image correcting layer. The prismatic structures cooperate in a Fresnellated lensing sense to bend the emitted light into the acceptance profile of the image-correcting layer. To avoid aliasing in the display image, the pitch of the series of prismatic structures may be somewhat smaller than the display pixel pitch, i.e. prismatic pitch in range of one-quarter to one-half pixel spacing, such as 15 µm to 33 µm for a pixel pitch of 60 µm to 66 µm, in some examples. While the example of FIG. 6 shows a periodic pitch, the pitch may be chirped or pseudo-randomized in some cases, to reduce aliasing with the display-pixel spacing.

In general, the series of prismatic structures 56 includes a material of a first refractive index $n_1$ opposing light-releasing surface 46, a material of a second refractive index $n_2$ opposing image-correcting layer 42, and a faceted step edge 58 forming a boundary between the material of the first refractive index and the material of the second refractive index. In the example shown in FIG. 6, image-correcting layer 42 includes a curved coverglass 60 of substantially constant thickness, which is bonded to luminance-correcting layer 44 via a fill layer 62. In general, the fill layer may have the same or different index of refraction as either layer to which it is bonded. In other embodiments, a monolithic coverglass having the edge-lens profile described hereinabove may be used, such that the coverglass and luminance-correcting layer are joined by a bonding layer of negligible thickness. The embodiment of FIG. 6 supports top and side viewing, as shown by two directions of the emerging rays. In some examples, light-releasing surface 46 of display matrix 20 is positioned about 150 µm below the physical interface between the display matrix and the luminance-correcting layer.

In some cases, prismatic structures presenting a lower refractive index toward the light-releasing surface and a higher refractive index toward the observer may achieve luminance correction by directing the peak luminance emitted from the curved display into the acceptance of image-correcting layer, but may also allow ambient light to be reflected and/or scattered by TIR, such that some of the ambient light emerges in the field of view of the observer. This can result in an apparent loss of image contrast among other unwanted effects. However, by orienting the higher-index layer toward the light-releasing surface and lower-index layer toward the image-correcting layer, ambient reflection and scattering is greatly reduced. In the illustrated example, accordingly, first refractive index $n_1$ is greater than second refractive index $n_2$. In this example, the material of higher refractive index is directly bonded to light-releasing surface 46, and the material of lower refractive index is directly bonded to image-correcting layer 42.

Continuing in FIG. 6, the series of prismatic structures 56 includes a subseries 56A with a plurality of facets arranged to refract light from light-releasing surface 46 directly into image-correcting layer 42. The prismatic facets of subseries 56A include refractive facets, and may be configured to deflect the light emerging from the light-releasing surface by 20° or less, in some examples. The series of prismatic structures of FIG. 6 also includes a subseries 56B with a plurality of facets arranged to reflect the light from the light-releasing surface, via TIR, onto an adjacent facet. The reflected light is then refracted into the image-correcting layer. Accordingly, such facets may be described as TIR-reflective/refractive facets. The prismatic facets of subseries 56B may be configured to deflect the light from the light-releasing surface by 15° or more, in some examples.

For both subseries of the series of prismatic structures 56, the facet angles are varied across luminance-correcting layer 44 to optimize acceptance of the light into the image-correcting layer. The example configuration shown in FIG. 6 demonstrates that the two different types of prismatic structures are usable together to provide a wide range of deviation angles, from display surface normal, to match acceptance angles of image-correcting layer 42. When a narrower range of deviation angles is expected, a single type of prismatic structure may suffice. For instance, a series consisting of only refractive facets may be used to provide deflection angles less than 20°, for edge lens designs which use a smaller fraction of the arc of curvature, and therefore require a lesser maximum deviation angle. Likewise, a series consisting of a combination of refractive facets and TIR reflective/refractive facets may be used to provide deflection angles in a range spanning from below 20° to greater than 15°, for edge-lens designs that use a significant portion of the arc of curvature of the display, such as a deviation angle range of 0° to near 40°, for a display curvature including a full 90° arc. The luminance-correcting layer may ideally redirect, or deviate, the peak luminance from the display surface normal into the acceptance of the image-correcting layer, such that a viewer sees the same or similar display luminance from the main plane of the display to the apparent edge of the display. It will be noted that the various rays represented in FIG. 6 are not extended to the point of emergence from the image-correcting layer, due to the scale of the drawing. As shown in FIG. 6, in some cases where both top and side viewing are desired, the light emitted by the display may be split and directed toward acceptance of the portion of the edge lens supporting front viewing (top in FIG. 6) as well as acceptance of the portion of the edge lens supporting side viewing (right side in FIG. 6). Moreover, the splitting ratio may vary with position along the curved corner portion. In such case, electronic boost of pixels within the splitting region may be utilized to achieve high uniformity, by varying the luminance of each pixel versus position in order to support both modes. In this manner, each or at least one display orientation—viz., the front and/or side—may appear uniform to the edge.

Figure 7A:
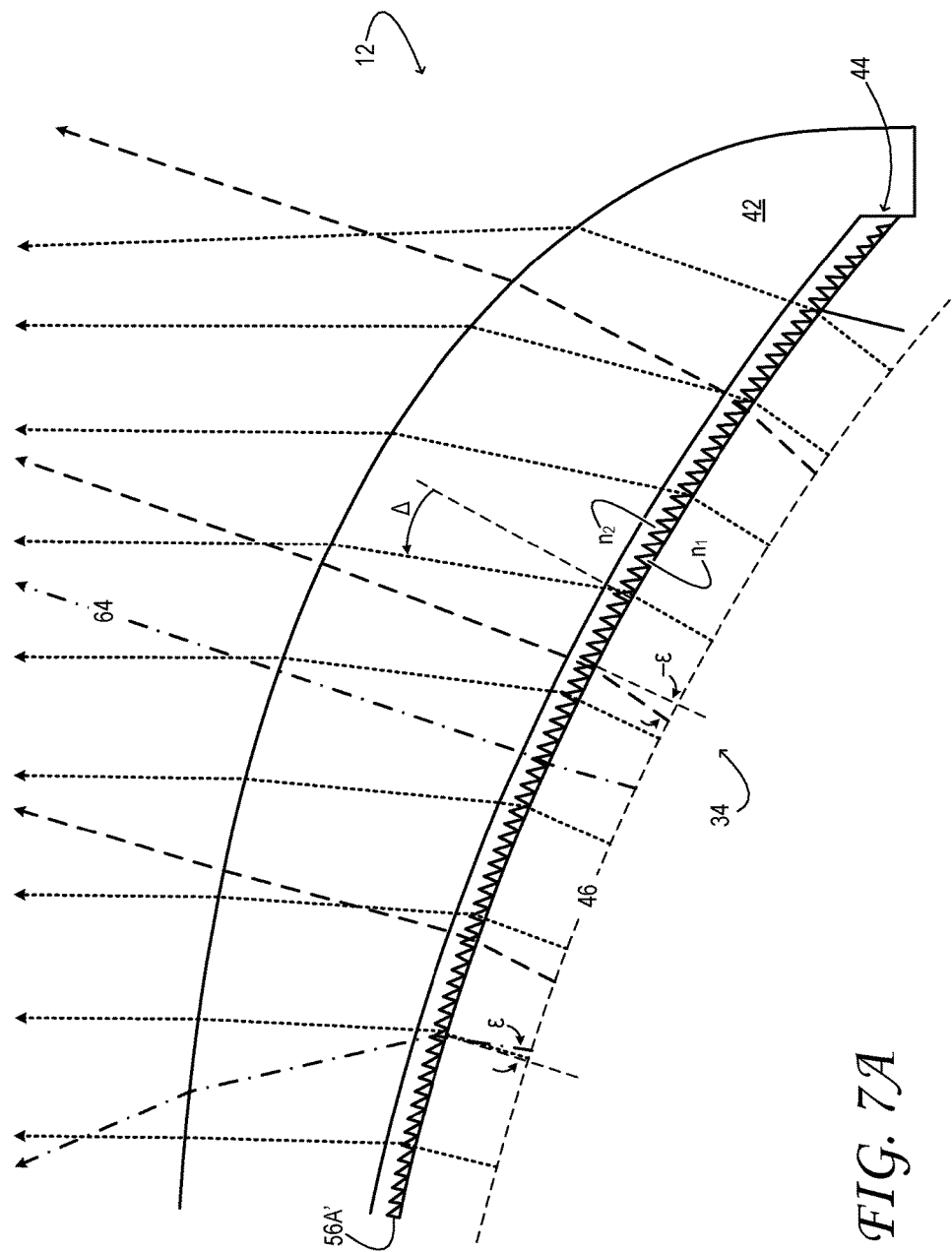
Figure 7B:
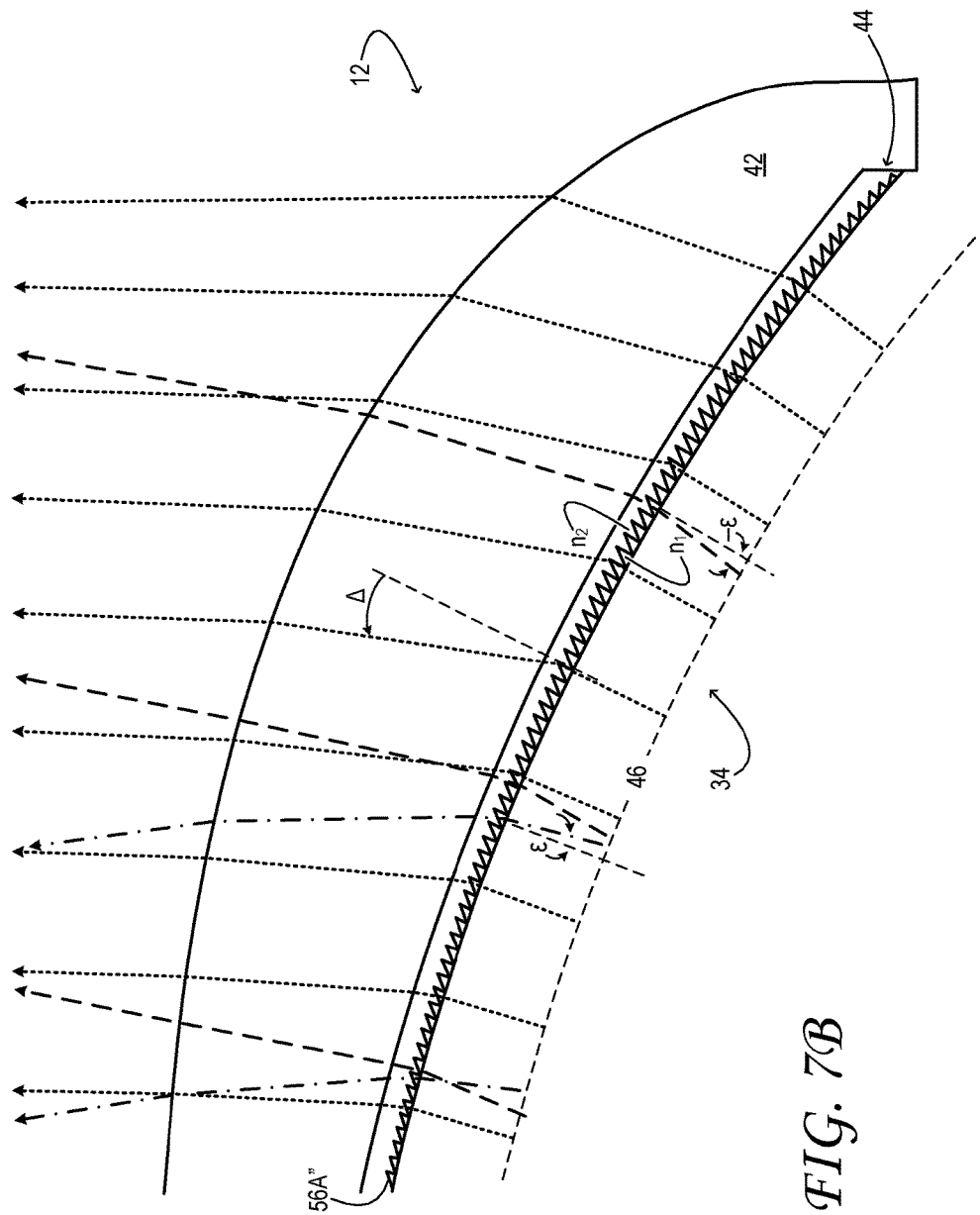

FIGS. 7A and 7B show luminance-correcting layers having series 56A' and 56A" of refractive facets for normal exiting rays. In these drawings, the dot-dashed rays represent light emitting at positive exit bias angle ε from the display normal. Such rays are refracted into a complementary biased view angle through refraction at the prismatic luminance-correcting layer and again at the interface with image-correcting layer 42. The refracted light is thereby made available to fill off-axis view angles, typically with positive bias. The dashed rays in FIGS. 7A and 7B represent light emitting at a negative exit angle ε from the display normal. Such rays are also made available, through refraction, to fill off-axis view angles. In FIG. 7A, the refractive index $n_1$ adjacent the display is greater than the refractive index $n_2$ adjacent the image-correcting layer. In FIG. 7B, the refractive index $n_1$ adjacent the display is less than the refractive index $n_2$ adjacent the image-correcting layer. Returning briefly to FIG. 6, it will be noted that the first section of refractive facets, up to about 20°, may be of similar orientation as the facets shown in FIG. 7B, in cases where the high index medium is arranged on the side of the image-correcting layer.

Although the series of facets shown in FIGS. 7A and 7B are refractive for normal exiting rays, it will be noted that such facets may also TIR-reflect then refract (akin to series 56B) for some display-emission angles. This scenario is illustrated by ray 64 in FIG. 7A. Effectively, the typically refracted rays take input angles and shift their angular content toward the user, but some rays that encounter a facet face at too high an angle are TIR-reflected and then refracted into a complimentary angle—viz., an angle of approximately equal but opposing angular direction relative to the normal of the main display plane.

Figure 8:
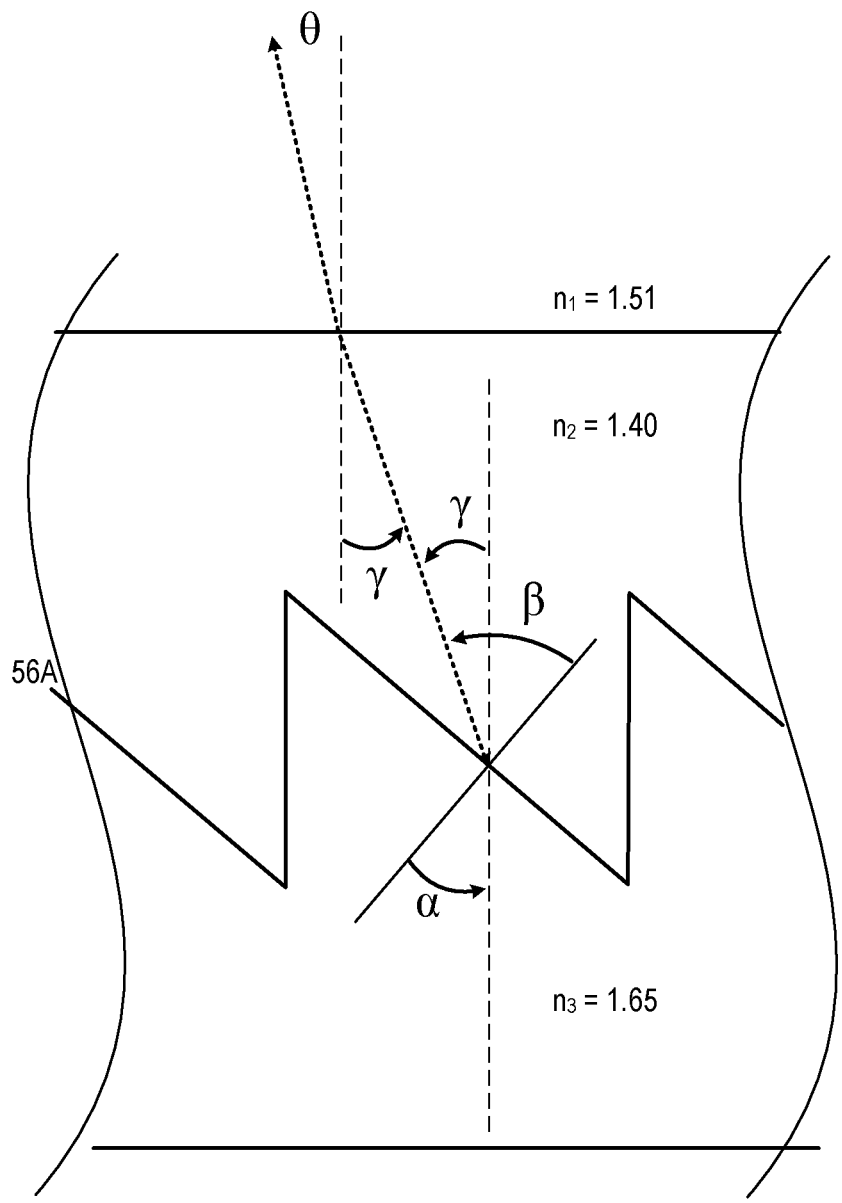
FIG. 8 shows aspects of a series of prismatic structures of an example luminance-correcting layer.

For refractive subseries 56A, the desired facet angle at any point along luminance-correcting layer 44 can be determined analytically. The procedure is summarized below, with reference now to FIG. 8. Deviation angle in media Δ, shown in FIG. 8 as θ, is the target angle for deviating the peak luminance from the emission layer of the display into the acceptance of the image-correcting layer, in order to achieve uniform apparent luminance to the edge of the display, as seen by viewer. Snell's Law applied to the $n_1/n_2$ interface requires $n_1 \sin \theta = n_2 \sin \gamma$. Snell's Law applied to the $n_2/n_3$ interface requires $n_2 \sin \beta = n_3 \sin \alpha$, with $\alpha = \beta - \gamma$. Thus, $n_1 \sin \theta = n_2 \sin (\beta - \alpha)$. It follows that $n_1 \sin \theta = n_2 \sin \beta \cos \alpha - \cos \beta \sin \alpha)$. Further, $\sin \beta = (n_3/n_2) \sin \alpha$. Substituting for $\cos \beta$ in terms of $\sin \beta$, we obtain $n_1 \sin \theta = n_2 [(n_3/n_2) \sin \alpha \cos \alpha - \{SQR[1-\sin^2 \beta]\} \sin \alpha]$. This provides θ in terms of α: $n_1 \sin \theta = n_2 [(n_3/n_2) \sin \alpha \cos \alpha - \{SQR[1-((n_3/n_2) \sin \alpha)^2]\} \sin \alpha]$. The skilled reader will understand from the above analysis that the desired facet angle for TIR reflective/refractive facets may also be determined analytically. Numerical ray tracing may be used as an alternative.

Figure 9A:
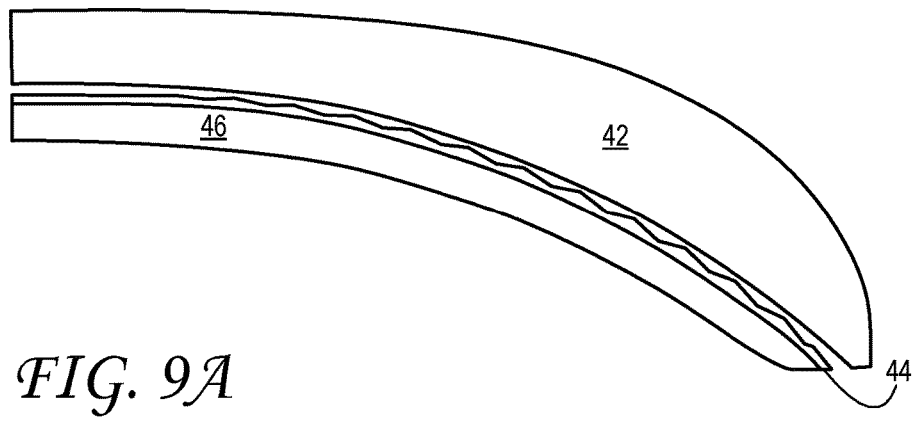
FIGS. 9A and 9B show complementary modes of incorporating an example luminance-correcting layer into an electronic display module.

The manner of forming a prismatic luminance-correcting layer 44 is not particularly limited, as various modes of fabrication lie within the spirit and scope of this disclosure. In some examples, a thin prismatic film may be fabricated in a flat conformation, wrapped around the curved display, and then bonded in position. A prismatic film of relatively high refractive index may be thermoformed from a polysulfone ($1.65 \leq n_1 \leq 1.7$), for example. A film having such high refractive index may be bonded to the light-releasing surface of a curved OLED display, before or after flexing or bending, as shown in FIG. 9A. Bonding of the thermoformed film may be achieved through use of an optically clear adhesive (OCA) or optically clear resin (OCR).

Figure 9B:
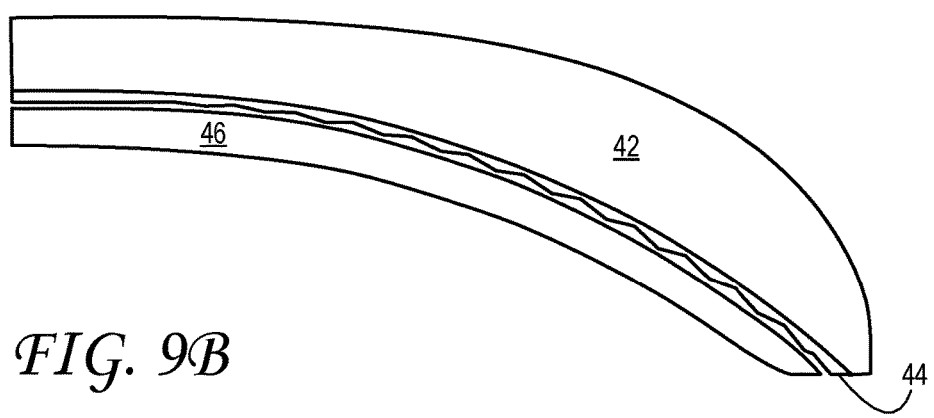

Conversely, a prismatic film of relatively low refractive index may be molded from PDMS or from another silicone ($n_2 \approx 1.4$), or from a low-index optical medium which is optically clear in thin film form, including a fluoropolymer film such as teflon. It is desirable for such a film to be thin relative to the thickness of image-correcting layer 42—e.g., a 70 μm to 125 μm film may be used for an image-correcting layer thickness of T=0.4 mm. A film having such low refractive index may be bonded to the underside of image-correcting layer 42, as shown in FIG. 9B. In some examples, accordingly, a luminance-correcting layer may be formed directly on the image-correcting layer. In one particular example, a constant thickness curved coverglass may be undermolded to include both the required profile of image-correcting layer 42 and the desired prismatic features of luminance-correcting layer 44.

In another alternative, a hybrid film may be prepared by filling a formed, high-index prismatic structure with low-index media. The high index structure may be thermoformed from a polysulfone, for instance, and then the prismatic facets filled with a low index optical media, such as silicone or a low-index UV-cure resin. This hybrid film-forming sequence is amenable to roll processing. The resulting hybrid prismatic film may be bonded to the underside of image-correcting layer 42 or to the top side of display module 12, or otherwise laminated between the two in a single-bond step. In other examples, a thin prismatic layer may be replicated on either of the components to which it is bonded. Thus, a thin layer of high index optically clear resin (OCR), such as a UV-cure resin, may be replicated on light-releasing surface 46 of the display, via a soft and/or flexible mold, or a rigid mold that may be released by shear sliding along the prisms. Then, a thin layer of low index UV-cure resin may be replicated on the underside of the image-correcting layer via a second soft and/or flexible mold, or another mold that may be released.

In yet another alternative using a high-index thermo-formed film, the film may cover both flat and curved regions of the display. The flat regions present a specular surface, since no deflection is required there. In the curved regions, prismatic features for deflecting light in the curved corner portions may be first bonded to the display, and then a low-index bond and prismatic fill layer may be applied to bond the display stack together.

Figure 10:
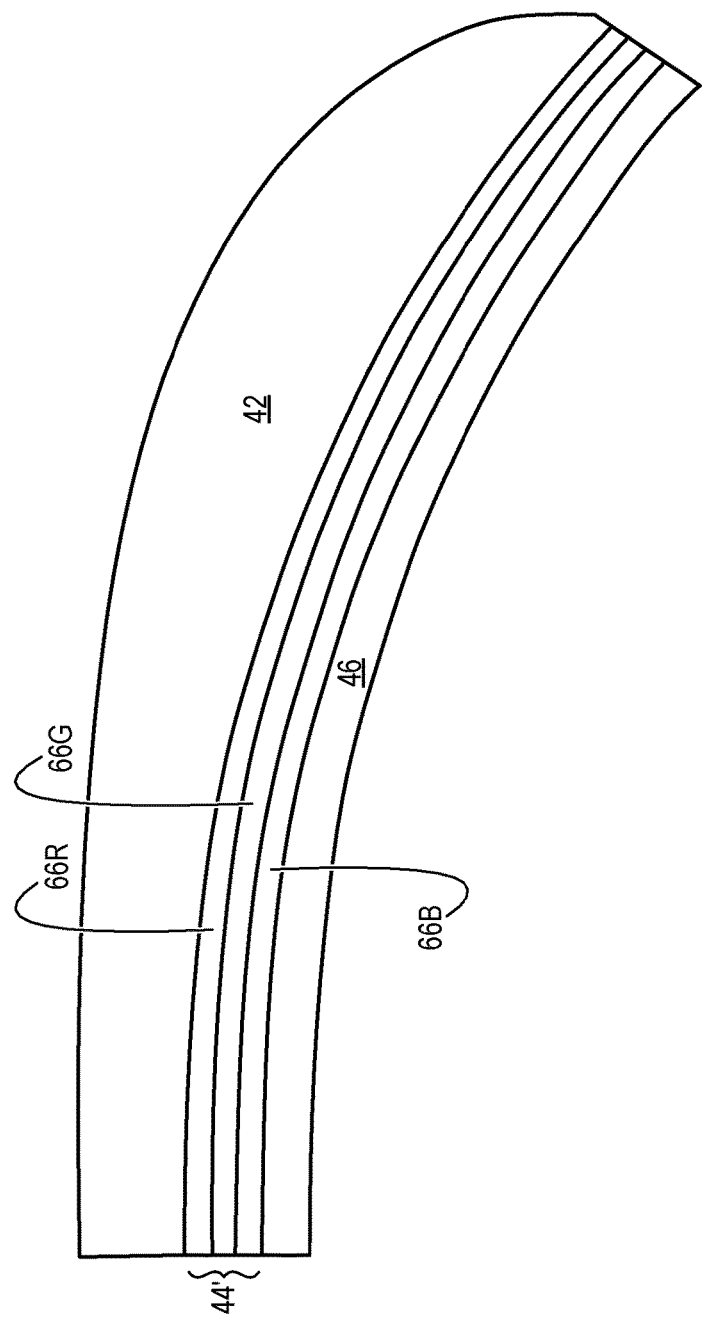
FIG. 10 shows aspects of another example luminance-correcting layer of an electronic display module.

FIG. 10 shows aspects of a luminance-correcting layer 44' in another example embodiment. In general, a luminance-correcting layer may include one or more holograms configured to deflect the light released from the curved corner portion into the acceptance profile of the image-correcting layer. In FIG. 10, the luminance-correcting layer includes three different volume holograms arranged in adjacent or contiguous 'parallel' layers, in the sense that the layers curve in parallel and have mutually parallel tangent lines at corresponding points along the curvature. The drawing shows a first hologram 66R excited by red light, a second hologram 66G excited by green light, and a third hologram 66B excited by blue light. One or more hologram layers may include multiple exposures in order to improve the angular response or reduce the number of layers required in order to achieve the desired deviation angle of the peak luminance. Other embodiments may include optical gratings capable of redirection of wide spread angle and visible light.

Figure 11:
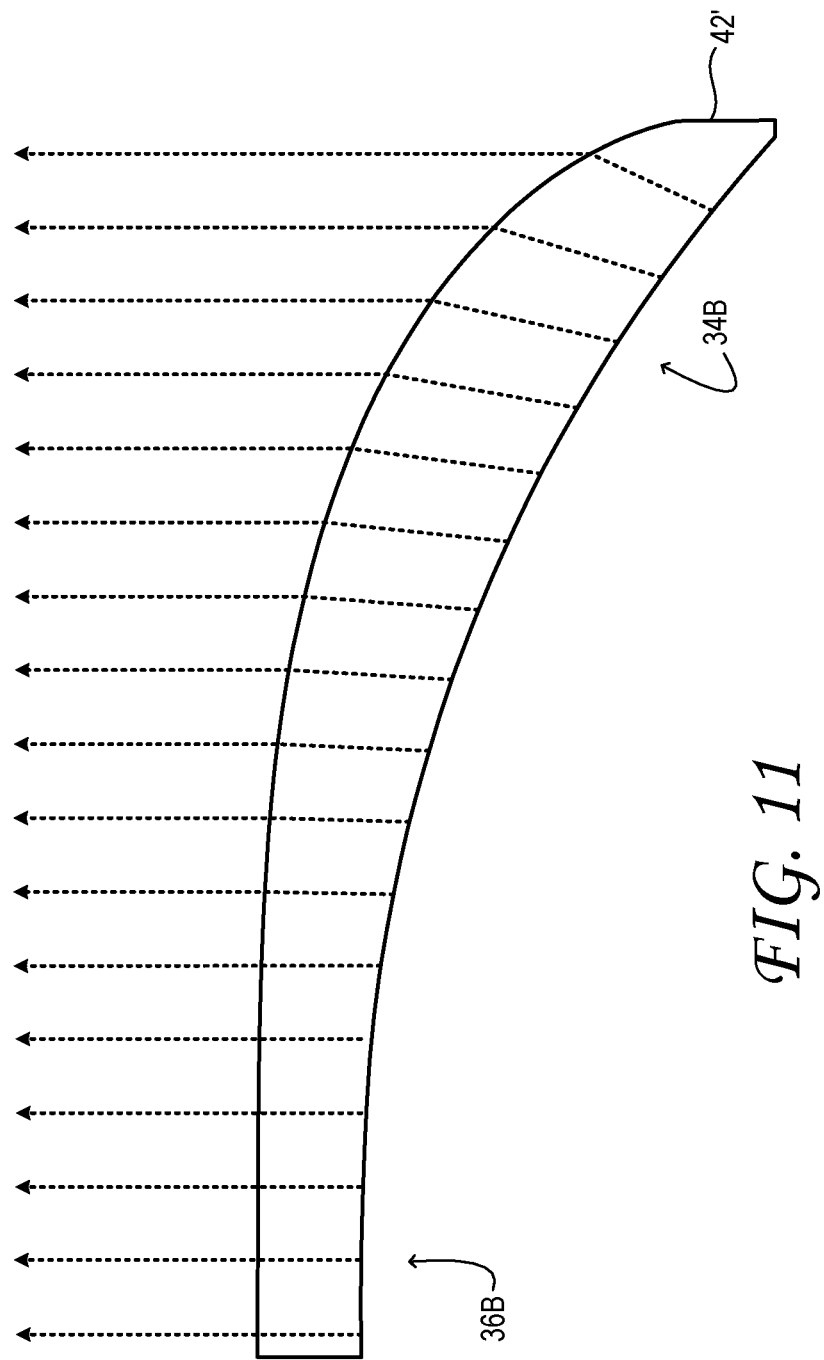
FIG. 11 shows aspects of another example image-correcting layer of an electronic display module.

No aspect of the foregoing drawings or description should be interpreted in a limiting sense, for numerous variations, extensions, and omissions are also envisaged. Luminance-correcting layer 44, for example, may not be necessary in every implementation. One approach to reducing the roll-off in luminance for a given radius of curvature is to utilize less than the full 90° arc length in the curved corner portion. This approach is illustrated in FIG. 11. This configuration may enable the display to appear similar to the binder seam of an open book—a desirable effect in some scenarios. Utilizing an arc length less than 90°, a pair of abutting display modules 12 meeting at a darkened edge 24 may provide a desirable book-like aesthetic. Further, a luminance-correcting layer may be used in partial sense, so as to achieve a portion of the deviation angle required to deviate the peak luminance into the acceptance of the image-correcting layer, so as to partially improve uniformity. This latter case may be combined with electronic boosting of display output luminance versus position across pixels to the edge and along the arc of curvature, in order to achieve uniformity to the apparent edge of the display.

Furthermore, if the display content is reflective (e.g., printed matter on substrate or comprising e-ink on e-paper), ambient light may serve as the illumination source, such that display appears reasonably uniform all the way to the edge. In still other implementations, the luminance uniformity roll-off may be addressed by electronically boosting the emitted output of the pixels within the curved corner portion. Here, the amount of increase in output luminance for each pixel may be adjusted so that the apparent plane image 50 of pixels may appear uniform in luminance all the way to the edge. In some cases, a correction profile of drive character may be utilized, e.g., having a non-linear ramp function from the beginning of the curved corner portion to the edge of the display. In some cases, a boost of as high as a factor of two may be utilized as part of the boosted correction driving profile of pixels within the curved corner portion, in order to achieve a prescribed uniformity of the pixels in apparent image plane to the edge. While one option is to lower the luminance in the flat face portion, such that the edge is boosted in a relative sense, overdriving the pixels in the curved corner portion enables the pixels of the flat face portion to provide a given minimum luminance for normal viewing. For instance, some OLED manufacturers provide a normal brightness and a high brightness mode, so one option is to use some of the high brightness range to boost the pixels of the curved corner portion so that the display device achieves uniformity for normal viewing.

As noted above, image-correcting layer 42 may enable display content to be presented all the way to edge of display module 12, for a truly borderless display. This usage scenario is not strictly necessary, however. For instance, the image-correcting layer may also be used to achieve close-to-edge display presentation, such as in cases where a geometric tuck around the curved edge hides some but not all of the black border of a display module. In general, the desired approach of the display content to the edge could be a parameter to be adjusted as desired, depending on target thickness, radius of curvature, and width of the inactive edge 24 of display matrix 20 (which may be 0.6 to 0.85 millimeters for some OLED displays). In other words, the image-correcting layer may support a borderless display system, however the scale of a particular display and finite border width may reveal cases where low distortion is achieved, but with an apparent black border, due to finite black border width. Further, while modular operation of electronic display module 12 is indeed contemplated, it is not always necessary. A borderless electronic display exhibiting low distortion all the way to the viewable edge 24 is useful even when used by itself. To emphasize this fact, electronic display module 12 can also be referred to as a 'electronic display', with no loss of generality.

Although image-correcting layer 42 is refractive in the above implementations, even this feature is not strictly necessary. In other implementations, the image-correcting layer may include one or more prismatic and/or holographic films, similar to the films described in the context of luminance-correcting layer 44. In other words, one prismatic and/or holographic film arranged at entry surface 54 of the image-correcting layer, and another at exit surface 52, may accomplish or assist in the reorientation of light from curved edge regions 42. Moreover, a prismatic and/or holographic film at entry surface 54 may be configured to achieve the combined effects of luminance and image correction.

In some scenarios, the solutions described above are sufficient, without any upstream correction of the image data, to reduce the optical distortion from display module 12 to acceptable levels. This does not imply, however, that the above solutions are exclusive of upstream image-data correction. Indeed, scenarios are envisaged in which an image-correcting layer 42 is used in combination with some upstream correction, for added benefit. In implementations in which aesthetic or manufacturing constraints do not permit a zero-distortion (c=1) image-correcting layer to be used, the image-correcting layer may be configured to provide a small amount of controlled distortion, which is nulled by upstream correction of the image data. One or more computers 14 of the display module or system may be used to effect the correction.

Finally, while image-correcting layer 42 is well-suited to correct image distortion from a curved, emissive (e.g., OLED) display, even that aspect is not strictly necessary. Indeed, the image-correcting layer as described herein may be used over a curved display matrix comprising e-ink on e-paper, which reflects and absorbs ambient light, and over curved printed media, such as ordinary paper. In these examples, a diffusely reflective front surface of the media may act as a surrogate for the emissive pixels noted above. In implementations where a display image is formed by controlling the reflection of light, light-releasing surface 46 may release light by reflection.

One aspect of this disclosure is directed to an electronic display comprising a light-releasing display surface, an image-correcting layer, and a luminance-correcting layer. The light-releasing display surface extends across a flat face portion and around a curved corner portion. Coupled to the light-releasing display surface, the image-correcting layer is configured to transmit light released from the flat face portion and to reorient light released from the curved corner portion such that the transmitted light and the reoriented light exit the image-correcting layer substantially in parallel, forming an apparent plane image of the flat face portion and the curved corner portion. Arranged between the light-releasing display surface and the image-correcting layer, the luminance-correcting layer is configured to deflect the light released from the curved corner portion into an acceptance profile of the image-correcting layer.

In some implementations, an angle of deflection of the light released from the curved corner portion is varied across the luminance-correcting layer to optimize acceptance of the light into the image-correcting layer. In some implementations, the luminance-correcting layer includes a series of prismatic structures configured to deflect the light released from the curved corner portion into the acceptance profile of the image-correcting layer. In some implementations, the series of prismatic structures includes a first subseries with a plurality of facets arranged to refract light from the light-releasing display surface directly into the image-correcting layer. In some implementations, the first subseries is configured to deflect the light from the light-releasing surface by 20 degrees or less. In some implementations, the series of prismatic structures includes a second subseries with a plurality of facets arranged to reflect light from the light-releasing display surface onto an adjacent facet, which refracts the light into the image-correcting layer. In some implementations, the second subseries is configured to deflect the light from the light-releasing surface by 15 degrees or more. In some implementations, the series of prismatic structures includes a material of a first refractive index opposing the light-releasing display surface, a material of a second refractive index opposing the image-correcting layer, and a faceted step edge forming a boundary between the material of the first refractive index and the material of the second refractive index. In some implementations, the first refractive index is greater than the second refractive index. In some implementations, the luminance-correcting layer includes one or more holograms configured to deflect the light released from the curved corner portion into the acceptance profile of the image-correcting layer. In some implementations, the one or more holograms include volume holograms. In some implementations, the one or more holograms are arranged in parallel layers. In some implementations, the one or more holograms includes a first hologram excited by red light, a second hologram excited by green light, and a third hologram excited by blue light. In some implementations, the luminance-correcting layer is formed directly on the image-correcting layer.

Another aspect of this disclosure is directed to an electronic display comprising a light-releasing display surface, an image-correcting layer, and a luminance-correcting layer. The light-releasing display surface extends across a flat face portion and around a curved corner portion. Coupled to the light-releasing display surface, the image-correcting layer is configured to transmit light released from the flat face portion and to reorient light released from the curved corner portion such that the transmitted light and the reoriented light exit the image-correcting layer substantially in parallel, forming an apparent plane image of the flat face portion and the curved corner portion. Arranged between the light-releasing display surface and the image-correcting layer, the luminance-correcting layer includes a series of prismatic structures configured to deflect the light released from the curved corner portion into an acceptance profile of the image-correcting layer. The series of prismatic structures includes a first subseries with a plurality of facets arranged to refract light from the light-releasing display surface directly into the image-correcting layer, and, a second subseries with a plurality of facets arranged to reflect light from the light-releasing display surface onto an adjacent facet, which refracts the light into the image-correcting layer.

In some implementations, the first subseries is configured to deflect the light from the light-releasing surface by 20 degrees or less, and the second subseries is configured to deflect the light from the light-releasing surface by 15 degrees or more.

Another aspect of this disclosure is directed to an electronic display comprising a light-releasing display surface, an image-correcting layer, and a luminance-correcting layer. The light-releasing display surface extends across a flat face portion and around a curved corner portion. Coupled to the light-releasing display surface, the image-correcting layer is configured to transmit light released from the flat face portion and to reorient light released from the curved corner portion such that the transmitted light and the reoriented light exit the image-correcting layer substantially in parallel, forming an apparent plane image of the flat face portion and the curved corner portion. Arranged between the light-releasing display surface and the image-correcting layer, the luminance-correcting layer includes a series of prismatic structures configured to deflect the light released from the curved corner portion into an acceptance profile of the image-correcting layer. The series of prismatic structures includes a material of higher refractive index opposing the light-releasing display surface and a material of lower refractive index opposing the image-correcting layer.

In some implementations, the electronic display further comprises a faceted step edge forming a boundary between the material of higher refractive index and the material of lower refractive index. In some implementations, the material of higher refractive index is bonded to the light-releasing display surface. In some implementations, the material of lower refractive index is bonded to the image-correcting layer.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic display comprising:
   a light-releasing display surface extending across a flat face portion and around a curved corner portion of a display matrix;
   an image-correcting layer coupled to the light-releasing display surface, the image-correcting layer being configured to transmit light released from the flat face portion and to reorient light released from the curved corner portion such that the transmitted light and the reoriented light exit the image-correcting layer substantially in parallel, forming an apparent plane image of the flat face portion and the curved corner portion; and
   a luminance-correcting layer arranged between the light-releasing display surface and the image-correcting layer, the luminance-correcting layer being configured to deflect the light released from the curved corner portion into an acceptance profile of the image-correcting layer, wherein the luminance-correcting layer includes a subseries of prismatic structures with a plurality of facets arranged to reflect light from the light-releasing display surface onto an adjacent facet, which then refracts the light into the image-correcting layer.

2. The electronic display of claim 1 wherein an angle of deflection of the light released from the curved corner portion is varied across the luminance-correcting layer to optimize acceptance of the light into the image-correcting layer.

3. The electronic display of claim 1 wherein the subseries of prismatic structures is a second subseries, and wherein the luminance-correcting layer also includes a first subseries of prismatic structures with a plurality of facets arranged to refract light from the light-releasing display surface directly into the image-correcting layer.

4. The electronic display of claim 3 wherein the first subseries is configured to deflect the light from the light-releasing display surface by 20 degrees or less.

5. The electronic display of claim 1 wherein the subseries is configured to deflect the light from the light-releasing display surface by 15 degrees or more.

6. The electronic display of claim 1 wherein the subseries of prismatic structures includes a material of a first refractive index opposing the light-releasing display surface, a material of a second refractive index opposing the image-correcting layer, and a faceted step edge forming a boundary between the material of the first refractive index and the material of the second refractive index.

7. The electronic display of claim 6 wherein the first refractive index is greater than the second refractive index.

8. The electronic display of claim 1 wherein the luminance-correcting layer includes one or more holograms configured to deflect the light released from the curved corner portion into the acceptance profile of the image-correcting layer.

9. The electronic display of claim 8 wherein the one or more holograms include volume holograms.

10. The electronic display of claim 8 wherein the one or more holograms are arranged in parallel layers.

11. The electronic display of claim 8 wherein the one or more holograms includes a first hologram excited by red light, a second hologram excited by green light, and a third hologram excited by blue light.

12. The electronic display of claim 1 wherein the luminance-correcting layer is formed directly on the image-correcting layer.

13. An electronic display comprising:
    a light-releasing display surface extending across a flat face portion and around a curved corner portion;
    an image-correcting layer coupled to the light-releasing display surface, the image-correcting layer being configured to transmit light released from the flat face portion and to reorient light released from the curved corner portion such that the transmitted light and the reoriented light exit the image-correcting layer substantially in parallel, forming an apparent plane image of the flat face portion and the curved corner portion; and
    a luminance-correcting layer arranged between the light-releasing display surface and the image-correcting layer, the luminance-correcting layer including a series of prismatic structures configured to deflect the light released from the curved corner portion into an acceptance profile of the image-correcting layer, the series of prismatic structures including:
      a first subseries with a plurality of facets arranged to refract light from the light-releasing display surface directly into the image-correcting layer, and,
      a second subseries with a plurality of facets arranged to reflect light from the light-releasing display surface onto an adjacent facet, which refracts the light into the image-correcting layer.

14. The electronic display of claim 13 wherein the first subseries is configured to deflect the light from the light-releasing display surface by 20 degrees or less, and the second subseries is configured to deflect the light from the light-releasing display surface by 15 degrees or more.

15. An electronic display comprising:
    a light-releasing display surface extending across a flat face portion and around a curved corner portion of a display matrix;
    an image-correcting layer coupled to the light-releasing display surface, the image-correcting layer having substantially constant thickness in a region arranged over the flat face portion and continuously varied thickness in a region arranged over the curved corner portion, the image-correcting layer being configured to transmit light released from the flat face portion and to reorient light released from the curved corner portion such that the transmitted light and the reoriented light exit the image-correcting layer substantially in parallel, forming an apparent plane image of the flat face portion and the curved corner portion; and
    a luminance-correcting layer arranged between the light-releasing display surface and the image-correcting layer, the luminance-correcting layer including a series of prismatic structures configured to deflect the light released from the curved corner portion into an acceptance profile of the image-correcting layer, the series of prismatic structures including:
      a subseries of prismatic structures with a plurality of facets arranged to reflect light from the light-releasing display surface onto an adjacent facet, which then refracts the light into the image-correcting layer, and a material of higher refractive index opposing the light-releasing display surface and a material of lower refractive index opposing the image-correcting layer.

16. The electronic display of claim 15 further comprising a faceted step edge forming a boundary between the material of higher refractive index and the material of lower refractive index.

17. The electronic display of claim 15 wherein the material of higher refractive index is bonded to the light-releasing display surface.

18. The electronic display of claim 15 wherein the material of lower refractive index is bonded to the image-correcting layer.

19. The electronic display of claim 15 wherein the subseries of prismatic structures is a second subseries, and wherein the luminance-correcting layer also includes a first subseries of prismatic structures with a plurality of facets arranged to refract light from the light-releasing display surface directly into the image-correcting layer.

* * * * *